(12) United States Patent
Saito et al.

(10) Patent No.: US 11,058,136 B2
(45) Date of Patent: Jul. 13, 2021

(54) SALTY TASTE ENHANCING COMPOSITION

(71) Applicant: KOHJIN LIFE SCIENCES CO., LTD., Tokyo (JP)

(72) Inventors: Yuki Saito, Oita (JP); Yoshie Yasumatsu, Oita (JP); Kenichi Ason, Oita (JP)

(73) Assignee: KOHJIN LIFE SCIENCES CO., LTD., Tokyo (JP)

( * ) Notice: Subject to any disclaimer, the term of this patent is extended or adjusted under 35 U.S.C. 154(b) by 245 days.

(21) Appl. No.: 16/301,606

(22) PCT Filed: May 15, 2017

(86) PCT No.: PCT/JP2017/018156
§ 371 (c)(1),
(2) Date: Nov. 14, 2018

(87) PCT Pub. No.: WO2017/199897
PCT Pub. Date: Nov. 23, 2017

(65) Prior Publication Data
US 2019/0191749 A1    Jun. 27, 2019

(30) Foreign Application Priority Data
May 16, 2016 (JP) .............................. JP2016-097969

(51) Int. Cl.
*A23L 27/40* (2016.01)
*A23L 27/00* (2016.01)
*A23C 19/09* (2006.01)
*A23C 19/00* (2006.01)
*A23L 23/00* (2016.01)

(52) U.S. Cl.
CPC .......... *A23L 27/40* (2016.08); *A23C 19/0904* (2013.01); *A23L 27/00* (2016.08); *A23L 27/88* (2016.08); *A23C 19/00* (2013.01); *A23L 23/00* (2016.08); *A23V 2002/00* (2013.01)

(58) Field of Classification Search
CPC .......... A23L 27/40; A23L 27/00; A23L 27/88; A23L 23/00; A23C 19/00; A23C 19/0904; A23V 2002/00
See application file for complete search history.

(56) References Cited

U.S. PATENT DOCUMENTS

| | | | |
|---|---|---|---|
| 5,000,977 A | 3/1991 | Marggrander et al. | |
| 5,476,675 A * | 12/1995 | Lou | A23G 1/56 426/590 |
| 5,711,985 A | 1/1998 | Guerrero et al. | |
| 6,444,448 B1 * | 9/2002 | Wheatcroft | C12P 19/04 435/101 |
| 2011/0250235 A1 * | 10/2011 | Saarinen | A23K 20/163 424/278.1 |
| 2014/0234526 A1 | 8/2014 | Yasumatsu et al. | |

FOREIGN PATENT DOCUMENTS

| | | |
|---|---|---|
| EP | 2 601 846 | 12/2013 |
| JP | 63-3766 | 1/1988 |
| JP | 4-108358 | 4/1992 |
| JP | 7-289198 | 11/1995 |
| JP | 11-187841 | 7/1999 |
| WO | 2012/017710 | 2/2012 |
| WO | 2013/031571 | 3/2013 |

OTHER PUBLICATIONS

Official Communication issued in International Bureau of WIPO Patent Application No. PCT/JP2017/018156, dated Aug. 1, 2017.

* cited by examiner

*Primary Examiner* — Anthony J Weier
(74) *Attorney, Agent, or Firm* — Greenblum & Bernstein, P.L.C.

(57) ABSTRACT

Low-salt processed foods or drinks frequently taste like something is missing because of the less salty taste thereof. Although salt substitutes and flavoring agents are often used to offer a sense of satisfaction, these additives exhibit only limited effects or cause some troubles of, for example, changing the original flavor of food. Under these circumstances, the present invention addresses the problem of enhancing the salty taste of a low-salt processed food or drink without imparting any undesired taste thereto. To solve the above problem, the present inventors conducted intensive studies and, as a result, found that an effect of comfortably and naturally enhancing salty taste can be achieved by adding a composition, which comprises dietary fibers, in particular, glucan and mannan at a specific ratio, to common processed foods or drinks including low-salt processed foods or drinks.

7 Claims, 2 Drawing Sheets

FIG. 2

```
<Flow>

Sample
   │  Add sulfuric acid to the sample (so as to be 1N)
   ↓
Heating the sample (at 110°C for 3.5 hr)
   │  (Discompose glucan and mannan into monosaccharides by
   │   acidic hydrolysis)
   ↓
Neutralize the sample by sulfuric acid hydrolysis with barium hydroxide
   │
   ↓
Perform centrifugation (at 8000 rpm for 5 min.)
   │
   ↓
Supernatant
   │
   ↓
0.45 µm filter
   │
   ↓
HPLC
   │
   ↓
Calculate the contents of glucan and mannan from the detected contents of glucose and mannose (glucan or mannan) = (content of glucose or mannose) × 162/180
```

SALTY TASTE ENHANCING COMPOSITION

TECHNICAL FIELD

The present invention relates to a composition having a salty taste enhancing effect. More specifically, the present invention relates to a method of enhancing reduced salty taste in a food or drink in which the amount of sodium salt is reduced from the viewpoint of health and the like, a food or drink having improved salty taste, and a composition having a salty taste enhancing effect.

BACKGROUND ART

Salt (sodium chloride) is widely used as a basic seasoning for seasoning foods. However, it is known that an excessive salt intake leads to adult diseases such as hypertension, stroke, and myocardial infarction. From the viewpoint of recent health consciousness, many low-salt processed foods or drinks have been proposed and commercialized.

However, salt is a basic taste, and thus so-called low-salt processed foods or drinks in which the amount of salt is reduced have a disadvantage in that the satisfaction degree in terms of eating quality is reduced due to the insufficient amount of salt. In order to compensate for this insufficient eating quality, various salt alternative substances and salty taste enhancing substances have been proposed so far.

The salt alternative substance is a substance which has salty taste in itself, and known examples thereof include potassium salts, ammonium salts, magnesium salts, basic amino acids, and peptides composed of basic amino acids. However, potassium salts and magnesium salts have a disadvantage in that they have a bitter taste in addition to a salty taste, resulting in a characteristic aftertaste. As techniques for reducing these unpleasant tastes, a seasoning composition obtained by blending specific proportions of potassium chloride, ammonium chloride, calcium lactate, sodium L-aspartate, L-glutamate and/or a nucleic acid-based taste substance (Patent Literature 1) and a method of removing the bitter taste of potassium chloride by combining with a calcium salt or magnesium salt of an organic acid (Patent Literature 2) are known. In addition, Patent Literature 3 describes a method including enhancing a salty taste in food or drink containing a sodium salt or potassium salt, and masking the bitterness of the potassium salt. However, the method has not reached a salt reduction technique that meets the needs of consumers because of unpleasant tastes other than salty taste, low salty taste intensity, and the like.

The salty taste enhancing substance cannot be substituted for salt, but can reduce the amount of salt to be used by enhancing the salty taste of salt. Examples of the salty taste enhancing substance include peptides obtained by hydrolysis of collagen having a molecular weight of 50,000 daltons or less (Patent Literature 4) and protein hydrolysates of various protein materials (Patent Literature 5). However, even in these cases, the salty taste intensity is still insufficient, and chloropropanols (i.e., carcinogenic substances) can be produced as by-products when hydrolyzing the proteins. Accordingly, there is a need for the salt reduction technique that meets the needs of consumers.

As described above, many methods of using salt alternative substances and methods of using salty taste enhancing substances have been proposed as the salt reduction methods. However, a satisfactory salt reduction method has not yet been developed from the viewpoints of preferences, effects, economic efficiency, and safety. Thus, there is a strong need for a salt reduction method that solves the above problems.

CITATION LIST

Patent Literature

Patent Literature 1: JP 11-187841 A
Patent Literature 2: JP 4-108358 A
Patent Literature 3: WO2012/017710
Patent Literature 4: JP 63-3766 A
Patent Literature 5: JP 7-289198 A

SUMMARY OF INVENTION

Technical Problem

Low-salt processed foods or drinks frequently taste like something is missing when they are eaten, because of the less salty taste thereof. Although salty-taste alternative substances and flavoring agents are often used to offer a sense of satisfaction, these additives exhibit only limited effects or cause some troubles of, for example, changing the original flavor of food. Under these circumstances, an object of the present invention is to enhance the salty taste of a low-salt processed food or drink without imparting any undesired taste thereto. Further, it is desirable that highly safe substances are used at that time.

Solution to Problem

In order to solve the above problem, the present inventors conducted intensive studies. As a result, they have found that an effect of comfortably and naturally enhancing salty taste can be achieved by adding a composition which contains dietary fibers, in particular, glucan and mannan at a specific ratio, to common processed foods or drinks such as low-salt processed foods or drinks.

That is, the present invention provides:

(1) A salty taste enhancing composition, including glucan and mannan, wherein the composition ratio (weight ratio) of glucan:mannan is 1:1.5 to 1:25; and (2) A method of enhancing salty taste, wherein the composition of (1) is added to food or drink.

Advantageous Effects of Invention

A small amount of the composition of the present invention is added to processed foods or drinks, so that salty taste can be enhanced without imparting a different flavor to the foods or drinks. The composition of the present invention can be used as a salty taste enhancing composition of foods or drinks or a salty taste enhancer.

BRIEF DESCRIPTION OF DRAWINGS

FIG. 2 shows a flow diagram of the measurement in the content and composition ratio of glucan and mannan in the composition.

DESCRIPTION OF EMBODIMENTS

Figure 1:
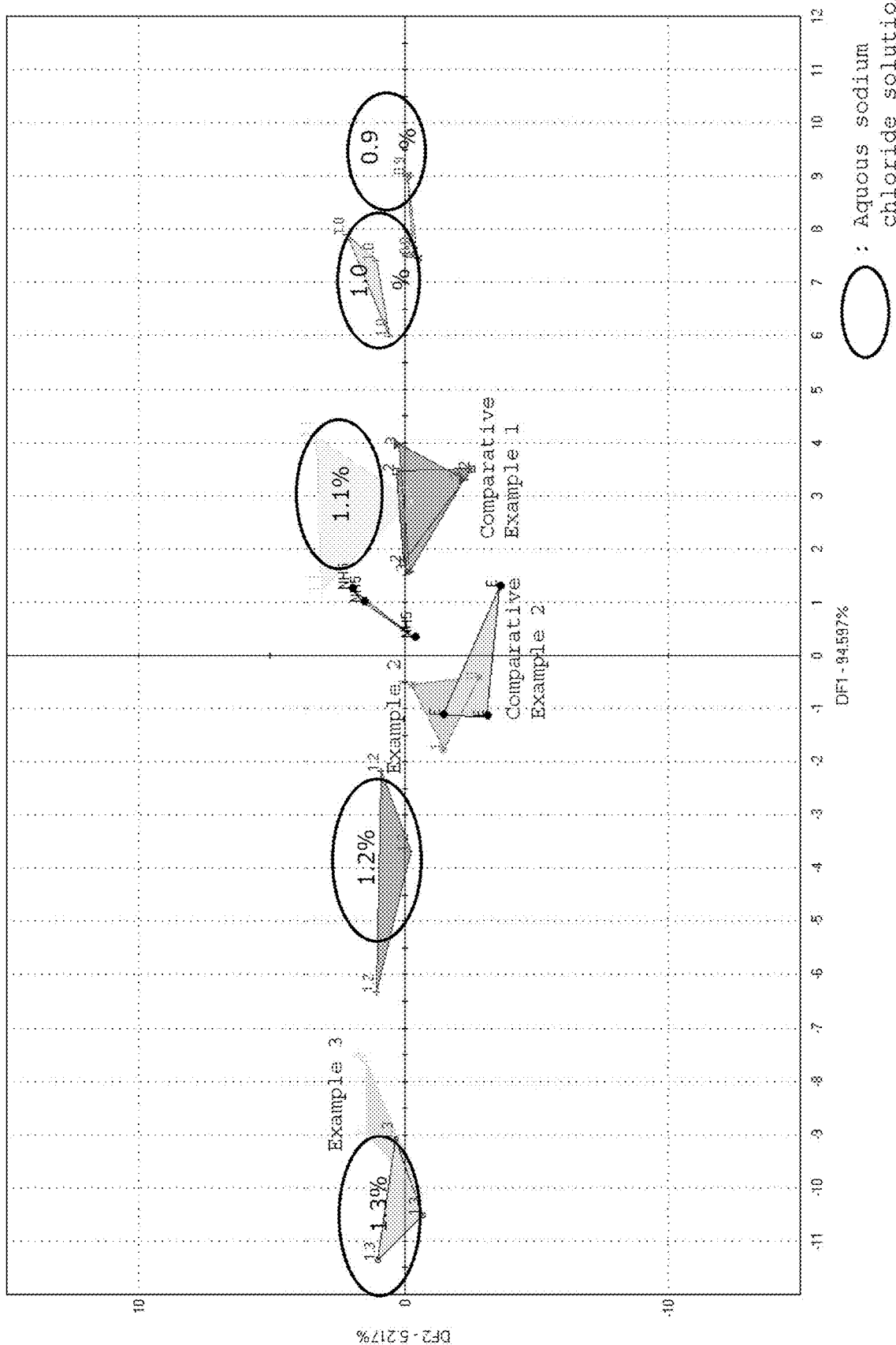
FIG. 1 shows the results of analyzing samples of Examples 1 to 3 and Comparative Examples 1 and 2 with a taste sensor (electronic taste system "Astree", manufactured by Alpha M.O.S. Japan K.K.).

The composition of the present invention is a composition containing glucan and mannan, and the ratio (weight ratio)

of glucan:mannan is desirably 1:1.5 to 1:25, preferably 1:1.5 to 1:20, more preferably 1:1.5 to 1:18, and more desirably 1:1.5 to 1:14. The type of glucan used in the present invention is not particularly limited. For example, glucan such as yeast cell wall-derived glucan, lactic acid bacterium-derived glucan or plant-derived glucan can be used.

The type of mannan used in the present invention is not particularly limited. For example, mannan derived from yeast cell wall or mannan derived from plant cell wall such as konjac yam can be used.

In the composition of the present invention, glucan and mannan from different origins (exemplified in the preceding paragraph) may be mixed, or glucan and mannan may be extracted from the same origin.

When glucan and mannan are obtained from the same raw material, they can be obtained from yeast cell wall components, for example. The yeast cell wall components are largely contained in the residues after extraction of yeast extracts, so that the composition of the present invention can be efficiently obtained. Specifically, the residues after extraction of yeast extracts are residues from which the yeast extracts are removed by extraction from edible yeasts using at least one of hot water, an alkaline solution, mechanical crushing, a cell wall-lysing enzyme, a proteolytic enzyme, ribonuclease, and deaminase. The residues generally contain dietary fibers including glucan and mannan, a protein, and a lipid as main components.

The procedure for making glucan and mannan into the composition of the present invention is, for example, a method including: further treating residues of yeast extracts with a proteolytic enzyme or ribonuclease; and obtaining a polymer component containing a large amount of cell wall components, besides a method of mixing individual glucan and mannan. Specifically, residues of yeast extracts extracted with hot water or treated with glucanase are subjected to a protease treatment and a ribonuclease treatment. The resulting residues are separated with a separation filtration membrane having a molecular weight cutoff of 13000, and a filtrate having a molecular weight of 13000 or more is recovered, thereby obtaining the composition.

The composition containing glucan and/or mannan obtained in the preceding paragraph, or the composition obtained by mixing glucan and mannan, if necessary, and preparing the mixture so that the composition ratio of glucan:mannan is 1:1.5 to 1:25 is the salty taste enhancing composition of the present invention. The content and composition ratio of glucan and mannan in the composition of the present invention are measured in the following manner. Sulfuric acid is added to the sample solution so as to be 1 N and the resulting sample solution is heated at 110° C. for 3.5 hours. During this process, polysaccharides in the cell wall components are decomposed into monosaccharides. After the heat treatment, the sample solution is neutralized with barium hydroxide to the pH of the sample solution before addition of sulfuric acid. After the neutralization, the neutralized sample solution is centrifuged, the obtained supernatant is filtered through a 0.45 μm filter, and the content of glucose and the content of mannose are measured by HPLC (A). On the other hand, the contents of glucose and mannose in the sample solution filtered through the 0.45 μm filter are measured by HPLC, and the measured values are used as blank values (B). Based on the values obtained by subtracting (B) from (A) as for glucose and mannose, the contents of glucose and mannose in the sample are calculated. The content ratio of glucan and mannan in the sample is determined from these calculated values.

TABLE 1

| <HPLC Conditions> | |
|---|---|
| Column | Shodex SUGAR SP0810 |
| Eluent | $H_2O$ |
| Flow rate | 0.7 mL/min |
| Detector | RI |
| Column temp. | 80° C. |

The flow for this process is set forth in FIG. 2.

Foods or drinks for which the salty taste enhancing composition of the present invention can be used are mainly low-salt processed foods or drinks, and the type thereof is not particularly limited. Examples thereof include various foods such as seasonings (e.g., miso, soy sauce, soup broth, baste, sauce, dressing, and mayonnaise), processed meat products (e.g., ham and sausage), processed marine products (e.g., kamaboko (boiled fish paste) and chikuwa (fish sausage)), processed agricultural products (e.g., pickles and tsukudani (food boiled in sweetened soy sauce)), and soup.

The addition amount of the product of the present invention to common processed foods or drinks including low-salt processed foods or drinks is appropriately adjusted depending on the food that enhances salty taste. In general, it is preferable to add the product of the present invention such that the total amount of glucan and mannan in the product of the present invention is 0.01 to 5% by weight, and more preferably 0.02 to 0.1% by weight based on the common processed foods or drinks. When the total amount is in the range of 0.01 to 5% by weight, it is possible to naturally enhance the salty taste of the common processed foods or drinks including low-salt processed foods or drinks. Although the salty taste enhancing effect varies depending on the food to be added, it is difficult to recognize the salty taste enhancing effect in the case where the addition amount is less than 0.01% by weight. Further, in the case where the addition amount is greater than 5% by weight, tastes other than salty taste may be significant or the salty taste may be masked.

EXAMPLES

Hereinafter, the present invention will be described in detail with reference to Examples. However, the present invention is not limited to the following embodiments.

Production Example 1

1000 mL of a 10% by weight cell suspension of Candida utilis yeast was adjusted to pH 3.5 using 10N sulfuric acid and heat-treated at 60° C. for 30 minutes, and the cells were recovered by centrifugation. The cells were washed with water to remove excessive extracts. The cells were suspended in water and adjusted to a concentration of 10% by weight, followed by heating at 90° C. for 30 minutes to completely inactivate enzymes in the cells. The temperature and pH of the cell suspension was adjusted to 40° C. and 7.0, respectively, a cell wall-lysing enzyme ("Tunicase" manufactured by Daiwa Fine Chemicals Co., Ltd.) was added thereto and reacted for 4 hours, thereby obtaining an extract. The temperature and pH of the reacted composition were adjusted to 45° C. and 8.0, respectively, and the composition was reacted with proteolytic enzymes ("Protin NY" manufactured by Amano Enzyme Inc., "XPP 488" manufactured by Nagase ChemteX Corporation.). After that, the resulting composition was heated at 90° C. to inactivate enzymes.

Further, the temperature and pH of the composition were adjusted to 69° C. and 5.8, respectively, and the composition was reacted with ribonuclease ("Nuclease Amano G", manufactured by Amano Enzyme Inc.). After that, the resulting composition was heated at 90° C. to inactivate enzymes. The obtained composition solution was separated with a separation filtration membrane ("UF Labo-Module ACP-1010D", manufactured by Asahi Kasei Corporation.) having a molecular weight cutoff of 13000, and the filtrate on the polymer side was recovered. The filtrate was pulverized by lyophilization to obtain a composition having a total content of glucan and mannan of 97% and a glucan:mannan content (weight) ratio of 1:2.5.

Production Example 2

A composition having a total content of glucan and mannan of 87% and a glucan:mannan content (weight) ratio of 1:18.1 was produced in the same manner as in Production Example 1 except that the step of adjusting the temperature and pH to 40° C. and 7.0, adding a cell wall-lysing enzyme ("Tunicase" manufactured by Daiwa Fine Chemicals Co., Ltd.), and reacting the mixture was excluded in Production Example 1.

Comparative Production Example 3

In Production Example 2, the temperature and pH of the filtrate (fraction having a molecular weight of 13000 or more) before lyophilization were adjusted to 40° C. and 7.0, respectively, and the filtrate was reacted with a cell wall-lysing enzyme ("Tunicase", manufactured by Daiwa Fine Chemicals Co., Ltd.) and pulverized by lyophilization. In the obtained composition, the total content of glucan and mannan was 67.5%, and the content (weight) ratio of glucan:mannan was 1:37.4.

Comparative Production Example 4

In Comparative Production Example 3, the solution before lyophilization was further separated with a separation filtration membrane ("UF Labo-Module ACP-1010D", manufactured by Asahi Kasei Corporation.) having a molecular weight cutoff of 13000, and the filtrate on the polymer side was recovered. The filtrate was pulverized by lyophilization to obtain a composition having a total content of glucan and mannan of 75.5% and a glucan:mannan content (weight) ratio of 1:31.8.

Example 1

0.026% by weight of dietary fiber derived from konjac ("Leorex LM" manufactured by Shimizu Chemical Corporation.) (glucan:mannan=1:1.6) was added to and dissolved in 1.0% by weight of aqueous sodium chloride solution. As a result of organoleptic evaluation, salty taste was increased as compared with 1.0% by weight of aqueous sodium chloride solution.

Example 2

0.026% by weight of the composition (glucan:mannan=1:2.5) obtained in Production Example 1 was added to and dissolved in 1.0% by weight of aqueous sodium chloride solution.

Example 3

0.026% by weight of the composition (glucan:mannan=1:18.1) obtained in Production Example 2 was added to and dissolved in 1.0% by weight of aqueous sodium chloride solution.

Comparative Example 1

0.026% by weight of the composition (glucan:mannan=1:37.4) obtained in Production Example 3 was added to and dissolved in 1.0% by weight of aqueous sodium chloride solution.

Comparative Example 2

0.026% by weight of the composition (glucan:mannan=1:31.8) obtained in Production Example 4 was added to and dissolved in 1.0% by weight of aqueous sodium chloride solution.

As a result of the organoleptic evaluation by addition of the composition to 1.0% by weight of aqueous sodium chloride solution, the salty taste of the samples of Examples 1, 2, and 3 was strongly felt compared with that of an additive-free aqueous sodium chloride solution. Among them, the samples of Examples 2 and 3 obviously showed a salty taste enhancing effect. On the other hand, a difference in taste between the samples of Comparative Examples 1 and 2 and the additive-free aqueous sodium chloride solution was not felt.

FIG. 1 shows the results of analyzing these samples with a taste sensor (electronic taste system "Astree", manufactured by Alpha M.O.S. Japan K.K.). The samples of Examples 2 and 3 showed a remarkable salty taste enhancing effect. In particular, the sample of Example 3 was mapped to a position close to 1.3% by weight of aqueous sodium chloride solution. As described above, the salty taste enhancing composition of the present invention showed a salty taste enhancing effect by objective analysis.

Example 4

To the cheese soup prepared as shown in Table 2, 0.026% by weight of the composition obtained in Production Example 2 was added and dissolved. Based on the organoleptic evaluation, the soup to which the composition obtained in Production Example 2 was added was compared with the soup to which the composition was not added. As a result, the former soup had a strong overall taste and a strong salty taste.

TABLE 2

| Cheese soup recipe | | |
|---|---|---|
| Raw material | Control plot | Example 4 |
| Cheddar cheese powder | 5.00 g | 5.00 g |
| Sodium chloride | 0.40 g | 0.40 g |
| Parmesan cheese powder | 1.00 g | 1.00 g |
| Chicken bouillon powder | 1.00 g | 1.00 g |
| Onion extract powder | 0.50 g | 0.50 g |
| Skim milk | 2.00 g | 2.00 g |
| Cream powder | 1.00 g | 1.00 g |
| Starch | 3.00 g | 3.00 g |
| Composition obtained in Production Example 2 | 0.00 g | 0.026 g |
| Total | 13.90 g | 13.926 g |

*Dissolved in 100 mL of hot water

The invention claimed is:

1. A salty taste enhancing composition, comprising glucan and mannan, wherein the composition ratio (weight ratio) of glucan:mannan is 1:1.5 to 1:25.

2. A method of enhancing salty taste, wherein the composition according to claim 1 is added to food or drink.

3. The salty taste enhancing composition according to claim 1, wherein the weight ratio of glucan:mannan is 1:14 to 1:25.

4. The salty taste enhancing composition according to claim 1, wherein the weight ratio of glucan:mannan is 1:18 to 1:25.

5. The salty taste enhancing composition according to claim 1, wherein the weight ratio of glucan:mannan is 1:18 to 1:20.

6. The method of enhancing salty taste enhancing composition according to claim 2, wherein the composition is added to food or drink in an amount of 0.01 to 5% by weight.

7. The method of enhancing salty taste enhancing composition according to claim 2, wherein the composition is added to food or drink in an amount of 0.02 to 0.1% by weight.

\* \* \* \* \*